United States Patent
Kim et al.

(10) Patent No.: US 8,811,469 B2
(45) Date of Patent: Aug. 19, 2014

(54) BLOCK MODE ENCODING/DECODING METHOD AND APPARATUS, AND METHOD AND APPARATUS FOR IMAGE ENCODING/DECODING USING THE SAME

(75) Inventors: Hayoon Kim, Seongnam-si (KR); Yungho Choi, Anyang-si (KR); Yoonsik Choe, Goyang-si (KR); Yonggoo Kim, Seoul (KR); Junhyuk Ahn, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 458 days.

(21) Appl. No.: 13/143,324

(22) PCT Filed: Dec. 29, 2009

(86) PCT No.: PCT/KR2009/007903
§ 371 (c)(1),
(2), (4) Date: Jul. 5, 2011

(87) PCT Pub. No.: WO2010/077071
PCT Pub. Date: Jul. 8, 2010

(65) Prior Publication Data
US 2011/0268188 A1    Nov. 3, 2011

(30) Foreign Application Priority Data

Jan. 5, 2009    (KR) .................. 10-2009-0000442

(51) Int. Cl.
*H04N 7/32*    (2006.01)
*H04N 7/36*    (2006.01)
*H04N 7/26*    (2006.01)
*H04N 7/34*    (2006.01)
*H04N 13/00*   (2006.01)

(52) U.S. Cl.
CPC ........... *H04N 7/345* (2013.01); *H04N 7/362* (2013.01); *H04N 7/26074* (2013.01); *H04N 7/26313* (2013.01); *H04N 7/26244* (2013.01); *H04N 7/26021* (2013.01); *H04N 19/00551* (2013.01)
USPC ........................................................ 375/240

(58) Field of Classification Search
USPC ........................................................ 375/240
See application file for complete search history.

(56) References Cited

U.S. PATENT DOCUMENTS 8,107,532 B2 * 1/2012 Gaedke ................. 375/240.12
8,149,910 B2 * 4/2012 Tanizawa et al. ...... 375/240.12
(Continued)

FOREIGN PATENT DOCUMENTS

KR    1020040093253    11/2004
KR    1020060107865    10/2006
(Continued)

OTHER PUBLICATIONS

International Search Report mailed Aug. 9, 2010 for PCT/KR2009/007903, citing the above reference(s).

*Primary Examiner* — Sath V Perungavoor
*Assistant Examiner* — Howard D Brown, Jr.
(74) *Attorney, Agent, or Firm* — Lowe Hauptman & Ham, LLP

(57) ABSTRACT

The present disclosure relates to method and apparatus for block mode encoding/decoding and a method and apparatus for video encoding/decoding using the same. The disclosure provides a block mode encoding apparatus that predicts the block mode of a current block and encodes the block mode of the current block depending on whether the block mode of the current block is same as the block mode predicted, to output encoded mode information. The disclosure can reduce the quantity of bits used to encode information on the block mode, thus enhancing the efficiency of video compression.

11 Claims, 13 Drawing Sheets

(56) References Cited

U.S. PATENT DOCUMENTS

| | | | |
|---|---|---|---|
| 8,462,851 B2* | 6/2013 | Lee et al. | 375/240.16 |
| 2007/0177671 A1* | 8/2007 | Yang | 375/240.25 |
| 2009/0086816 A1* | 4/2009 | Leontaris et al. | 375/240.03 |
| 2009/0207913 A1* | 8/2009 | Kim et al. | 375/240.12 |
| 2010/0086034 A1* | 4/2010 | Park et al. | 375/240.12 |
| 2011/0170603 A1* | 7/2011 | Sato et al. | 375/240.16 |
| 2011/0249741 A1* | 10/2011 | Zhao et al. | 375/240.15 |
| 2012/0014436 A1* | 1/2012 | Segall et al. | 375/240.12 |
| 2012/0106631 A1* | 5/2012 | Kim et al. | 375/240.03 |
| 2012/0147137 A1* | 6/2012 | Jeon et al. | 348/43 |
| 2012/0327999 A1* | 12/2012 | Francois et al. | 375/240.02 |
| 2013/0028530 A1* | 1/2013 | Drugeon et al. | 382/233 |

FOREIGN PATENT DOCUMENTS

| | | |
|---|---|---|
| KR | 1020060108475 | 10/2006 |
| WO | 03/105070 | 12/2003 |

\* cited by examiner

| HISTORY TABLE ||||||||
|---|---|---|---|---|---|---|---|
| A | B | C | D | 16X16 (1) | 16X8 (2) | 8X16 (3) | 8X8 (4) |
| 1 | 2 | 1 | 2 | 20 | 0 | 3 | 1 |
| 3 | 1 | 1 | 2 | 0 | 5 | 4 | 1 |
| 4 | 4 | 4 | 4 | 1 | 0 | 0 | 20 |

BLOCK MODE ENCODING/DECODING METHOD AND APPARATUS, AND METHOD AND APPARATUS FOR IMAGE ENCODING/DECODING USING THE SAME

CROSS REFERENCE TO RELATED APPLICATION

This application claims the priority of Korean Patent Application No. 10-2009-0000442, filed on Jan. 5, 2009, in the KIPO (Korean Intellectual Property Office), the disclosure of which is incorporated herein in their entirety by reference. Further, this application is the National Phase application of International Application No. PCT/KR2009/007903, filed Dec. 29, 2009, which designates the United States and was published in English. Each of these applications is hereby incorporated by reference in their entirety into the present application.

TECHNICAL FIELD

The present disclosure relates to a method and apparatus for block mode encoding/decoding and a method and apparatus for image encoding/decoding using the same. More particularly, the present disclosure relates to a method and apparatus for block based image encoding or decoding in a way to reduce the quantity of bits required to encode information regarding block mode, thus enhancing the efficiency of compression.

BACKGROUND ART

The statements in this section merely provide background information related to the present disclosure and may not constitute prior art.

In typical video compression techniques seeking more efficient compression, an inter prediction between pictures and an intra prediction within a picture are carried out using differently sized image blocks. In addition, to identify the prediction method and the block size for the block to be encoded, prediction modes are classified by the prediction method and the respective prediction modes are given mode numbers. For improving the compression efficiency, such prediction modes are classified and used in different kinds providing a plurality of the mode numbers. Therefore, in the typical video compression techniques, encoding of mode information is performed by using a plurality of bits and encoding the mode number depending on the prediction mode used for the current block in the process of encoding the prediction mode.

However, the greater current demands for high resolution video requirements have increased the number of blocks to be encoded, which in turn increased the quantity of the required bits to encode the mode information, resulting in a degradation of the compression efficiency.

DISCLOSURE

Technical Problem

Principally, the present disclosure has been made for encoding mode information of blocks so that the quantity of bits required to encode information on the block modes is reduced to enhance the video compression efficiency.

Technical Solution

One aspect of the present disclosure provides a block mode encoding apparatus including: a block mode predictor for performing a prediction of a block mode of a current block; and a block mode encoder for encoding the block mode of the current block and outputting encoded mode information depending on whether the block mode after the prediction is identical to the block mode of the current block mode.

Here, the block mode encoder may be responsive to identity between the block mode after the prediction and the block mode of the current block mode for generating the encoded mode information by encoding a bit flag for indicating the identity, and it may be responsive to nonidentity between the block mode after the prediction and the block mode of the current block mode for generating the encoded mode information by encoding a bit flag for indicating the nonidentity. The bit flag may comprise a single bit, and the block mode predictor may use a history table in the prediction of the block mode of the current block.

Another aspect of the present disclosure provides a block mode encoding method including: performing a prediction of a block mode of a current block; and encoding the block mode of the current block and outputting encoded mode information depending on whether the block mode after the prediction is identical to the block mode of the current block mode.

Yet another aspect of the present disclosure provides a block mode decoding apparatus for decoding a block mode including: a bit flag comparator for extracting a bit flag from encoded mode information and analyzing the bit flag to determine whether the bit flag indicates the block mode of the current block to be predicted; a block mode predictor, in response to the bit flag indicating the block mode of the current block is predicted, predicting the block mode of the current block to output a predicted block mode of the block mode as the block mode of the current block; and a block mode decoder, in response to the bit flag indicating the block mode of the current block is not predicted, extracting an encoded block mode of the current block from the encoded mode information and decoding the encoded block mode to generate a reconstructed block mode of the current block to be outputted as the block mode of the current block.

Here, the bit flag may comprise a single bit, and the block mode predictor may use a history table in the predicting of the block mode of the current block.

Yet another aspect of the present disclosure provides a block mode decoding method for decoding a block mode including: extracting a bit flag from encoded mode information and analyzing the bit flag to determine whether the bit flag indicates the block mode of the current block to be predicted; if the bit flag indicates the block mode of the current block to be predicted, predicting the block mode of the current block; outputting a predicted block mode of the block mode as the block mode of the current block; and if the bit flag does not indicate the block mode of the current block to be predicted, extracting an encoded block mode of the current block from the encoded mode information; decoding the encoded block mode after being extracted to reconstruct a block mode of the current block; and outputting the block mode of the current block after being reconstructed as the block mode of the current block.

Yet another aspect of the present disclosure provides a video encoding apparatus including: a block mode determiner for making a determination on a block mode of a current block; a block pattern creator for generating a coded block pattern by predicting the current block according to the block mode of the current block after the determination; a bit flag configuration unit for performing a prediction of the block mode of the current block and configuring a bit flag for indicating whether the block mode after the prediction is identical to the block mode of the current block; and an encoder, in response to the bit flag indicating the block mode after the prediction is identical to the block mode of the current block, encoding the bit flag and the coded block pattern to generate a bitstream, and in response to the bit flag indicating the block mode after the prediction is not identical to the block mode of the current block, encoding the bit flag, the block mode of the current block, and the coded block pattern to generate and output a bitstream.

Here, the bit flag may comprise a single bit, and the bit flag configuration unit may use a history table in the prediction of the block mode of the current block.

Yet another aspect of the present disclosure provides a video encoding method including: determining a block mode of a current block; generating a coded block pattern by predicting the current block according to the block mode of the current block after being determined; performing a prediction of the block mode of the current block; configuring a bit flag for indicating whether the block mode after the prediction is identical to the block mode of the current block; if the bit flag indicates the block mode after the prediction to be identical to the block mode of the current block, encoding the bit flag and the coded block pattern to generate and output a bitstream; and if the bit flag indicates the block mode after the prediction not to be identical to the block mode of the current block, encoding the bit flag, the block mode of the current block, and the coded block pattern to generate and output a bitstream.

Yet another aspect of the present disclosure provides a video decoding apparatus including: a bit flag comparator for extracting and analyzing a bit flag from a bitstream to determine whether the bit flag indicates a block mode of a current block mode to be predicted; a block mode predictor, in response to the bit flag indicating the block mode of the current block is predicted, predicting the block mode of the current block to output a predicted block mode of the block mode as the block mode of the current block; a block mode decoder, in response to the bit flag indicating the block mode of the current block is not predicted, extracting an encoded block mode of the current block from the bitstream and decoding the encoded block mode to generate a reconstructed block mode of the current block to be outputted as the block mode of the current block; and a block pattern decoder for extracting a coded block pattern from the bitstream and decoding the coded block pattern according to the block mode of the current block being outputted to reconstruct the current block.

Here, the bit flag may comprise a single bit, and the block mode predictor may use a history table in the prediction of the block mode of the current block.

Yet another aspect of the present disclosure provides a video decoding method including: extracting and analyzing a bit flag from a bitstream to determine whether the bit flag indicates a block mode of a current block mode to be predicted; if the bit flag indicates the block mode of the current block to be predicted, performing a prediction of the block mode of the current block; outputting the block mode after the prediction as the block mode of the current block; if the bit flag indicates the block mode of the current block not to be predicted, extracting an encoded block mode of the current block from the bitstream and decoding the encoded block mode to generate a reconstructed block mode of the current block; outputting the reconstructed block mode of the current block as the block mode of the current block; and extracting a coded block pattern from the bitstream and decoding the coded block pattern according to the block mode of the current block being outputted to reconstruct the current block.

Advantageous Effects

According to the disclosure as described above, the present disclosure provides effective video encoding/decoding on the residual signals of the impulsive component and improves the compression efficiency to enhance the video compression performance.

MODE FOR INVENTION

Figure 1:
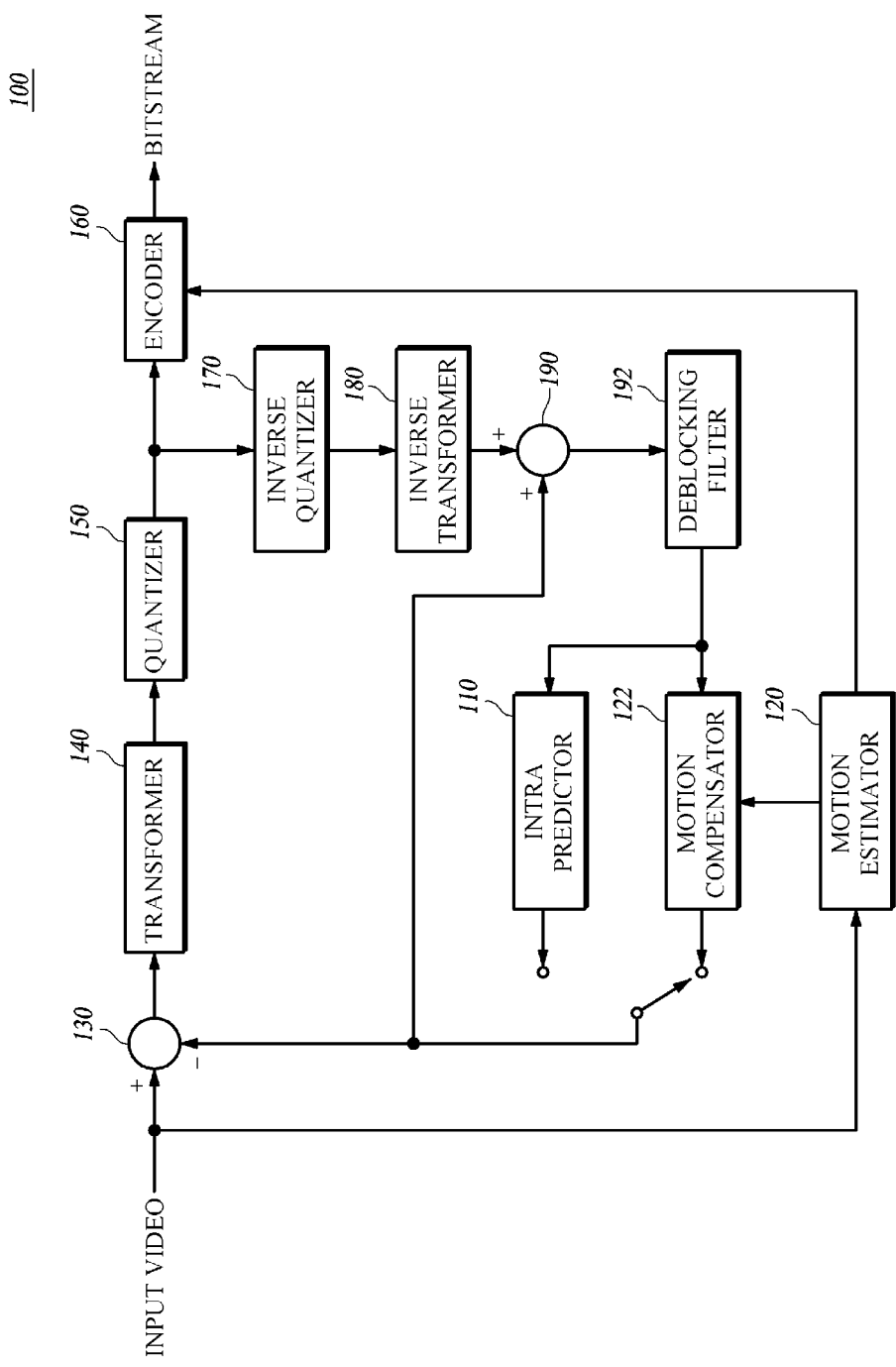
FIG. 1 is an exemplary diagram for schematically showing a configuration of a video encoding apparatus according to H.264/AVC.

Hereinafter, aspects of the present disclosure will be described in detail with reference to the accompanying drawings. In the following description, the same elements will be rather designated by the same reference numerals although they are shown in different drawings. Further, in the following description of the present disclosure, a detailed description of known functions and configurations incorporated herein will be omitted when it may make the subject matter of the present disclosure unclear.

Also, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, it may mean the components are not only directly 'connected', 'coupled', or 'linked' but also are indirectly 'connected', 'coupled', or 'linked' via a third component.

FIG. 1 is an exemplary diagram for schematically showing a configuration of a video encoding apparatus 100 according to H.264/AVC.

In most commercial video compression methods and their apparatuses (H.263, MPEG-4, H.264/AVC, etc.), to remove spatial redundancies and temporal redundancies in videos, encoded blocks are defined by different sizes of blocks such as macroblocks or subblocks, and a prediction process is carried out based on a current block to be currently encoded and thereby obtains a predicted block. Such predicted block obtained is put into subtraction from the current block to generate a residual block which then goes through a transform, quantization, and entropy encoding thereby compressing the video.

Depending on the compressing methods such as H.263, MPEG-4, and H.264/AVC, there are principally two prediction methods of the intra prediction and the inter prediction. The inter prediction takes advantage of the temporal redundancies and performs a motion compensation/estimation by referring to a reference frame recovered by decoding an encoded image. The motion compensation at this time is performed using various shapes of blocks according to the video coding standards.

Video encoding apparatus 100 according to the video compression method of H.264/AVC illustrated in FIG. 1 may comprise an intra predictor 110, a motion estimator 120, a motion compensator 122, a subtractor 130, a transformer 140, a quantizer 150, an encoder 160, an inverse quantizer 170, an inverse transformer 180, an adder 190, and a deblocking filter 192.

Intra predictor 110 predicts pixels in a current block to be currently encoded to generate a predicted block by using adjacent pixels in a block neighboring the current block. Motion estimator 120 estimates the motion of the current block using the reference frame referred to by a current frame containing the current block to determine a motion vector, and motion compensator 122 compensates the motion of the current block using the determined motion vector from motion estimator 120 to predict the current block and thereby generates the predicted block. Motion estimator 120 and motion compensator 122 may be implemented as the inter predictor, and intra predictor 110 and the inter predictor may be implemented by a single predictor.

Subtractor 130 subtracts the predicted block from intra predictor 110 or motion compensator 122 from the current block of the input image to generate a residual block containing residual signals, and transformer 140 transforms the residual signals of the residual block using various frequency transform techniques such as Discrete Cosine Transform or Hadamard transform into the frequency domain to generate frequency coefficients, and quantizer 150 quantizes the frequency coefficients using various quantization techniques such as Quantization Weighted Matrix to generate a residual block having quantized frequency coefficients. Encoder 160 encodes the residual block having the quantized frequency coefficients using the entropy encoding or other encoding techniques to generate a bitstream.

Meanwhile, intra predictor 110 and motion compensator 122 predict the current block by using a reconstructed adjacent block that has gone through previous encoding and decoding or a reference of a reference block, for which inverse quantizer 170 inversely quantizes the quantized frequency coefficients from quantizer 150 to reconstruct the residual block having the frequency coefficients, and inverse transformer 180 performs an inverse frequency transform on the residual block having the frequency coefficients to reconstruct the residual block having the residual signals. Adder 190 adds the predicted block from intra predictor 110 or motion compensator 122 to the residual signals of the reconstructed residual block to generate the current block which is then deblocking-filtered in deblocking filter 192 for correction from a block distortion and delivered to intra predictor 110 and motion compensator 122. Such reconstructed current block is used to predict the next block or its subsequent blocks to be encoded.

Figure 2:
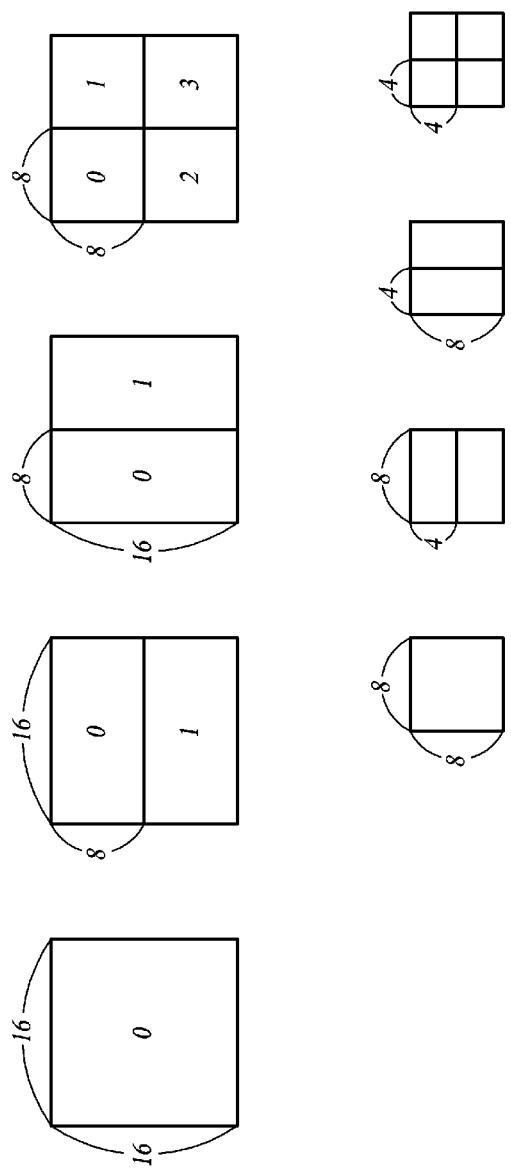
FIG. 2 is exemplary diagram for showing block modes used in an inter prediction between pictures according to H.264/AVC.

In a way to predict a current block to generate a predicted block, predicting and compensating the motion of the current block may need to use up to seven different sizes of motion compensation blocks from sizes 16×16 to 4×4 as shown in FIG. 2. The intra prediction takes advantage of the spatial redundancies and utilizes the correlation between the adjacent block in performing the compression, which also needs to use different shapes of blocks to carry out predictions. MPEG-4 compressions use 8×8 size blocks, and H.264/AVC compressions use 4×4 and 16×16 sizes of blocks to perform the intra predictions.

In performing such predictions, using the various sizes of blocks is to deal with complex images that can be effectively predicted with small blocks as well as plain images that can be effectively predicted with bigger blocks. H.264/AVC has a compression performance twice as better than its prior standardized codec standards (H.263, MPEG-4), which is mainly due to the use of more diverse block shapes over the conventional standard codecs.

In this way, the current commercial video compression methods and their apparatuses take advantage of the differently sized blocks in performing the inter prediction and the intra prediction for the sake of the effective video compression. Additionally, they use mode numbers to identify the prediction method for the block to be encoded and the block size. Since various sizes of blocks are used for improvement and there are multiple mode numbers to be encoded, the current commercial video codecs use multiple bits to encode mode information.

Figure 3:
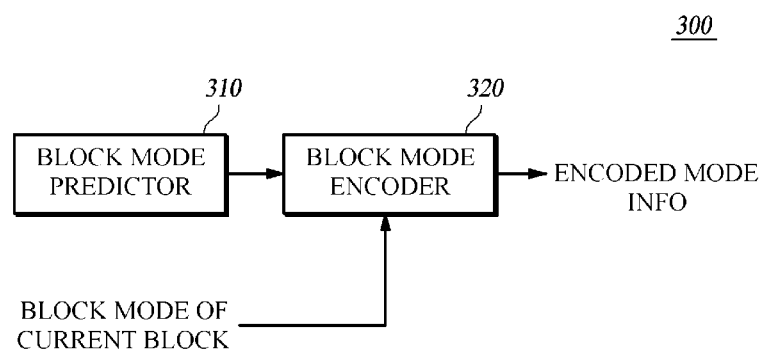
FIG. 3 is a schematic block diagram for illustrating a block mode encoding apparatus according to an aspect of the present disclosure.

FIG. 3 is a schematic block diagram for illustrating a block mode encoding apparatus 300 according to an aspect of the present disclosure.

Block mode encoding apparatus 300 in this aspect may comprise a block mode predictor 310 and block mode encoder 320. Such block mode encoding apparatus 300 may be a personal computer or PC, notebook or laptop computer, personal digital assistant or PDA, portable multimedia player or PMP, PlayStation Portable or PSP, or mobile communication terminal, smart phone or such devices, and represents a variety of apparatuses equipped with, for example, a communication device such as a modem for carrying out communications between various devices or wired/wireless communication networks, a memory for storing various programs for encoding the encoding modes and related data, and a microprocessor for executing the programs to effect operations and controls. In addition, depending on the method of implementation, it may be implemented as a program module installed in the various apparatuses stated above or as a singular hardware unit.

Block mode predictor 310 predicts the block mode of a current block. Specifically, block mode predictor 310 predicts the current block mode using the current block, its adjacent block, a reference frame or other varied information in such a manner as can be equally predicted by a block mode decoding apparatus and a video decoding apparatus as will be described later. For example, block mode predictor 310 may predict the current block mode using a history table. Using the history table to predict the current block mode will be described in detail with reference to FIGS. 5 to 8.

Block mode encoder 320 encodes the current block mode depending on whether the current lock mode is identical to the predicted block mode to output encoded mode information. Specifically, block mode encoder 320 compares between the predetermined current block mode and the predicted block mode from block mode predictor 310 to determine if the two block modes are identical and accordingly encode the current block mode.

For example, when the current block mode and the predicted block mode are identical, block mode encoder 320 may encode just the bit flag for indicating the equality of the two block modes to generate encoded mode information, and when the current block mode and the predicted block mode are not identical, it may encode both a bit flag for indicating the inequality of the current block mode and the predicted block mode and the current block mode to generate encoded mode information. At this time, block mode encoder 320 may use, for example, the entropy encoding technique to encode just the bit flag or both the bit flag and the current block mode.

In other words, just the bit flag may be encoded when the current block mode is identical to the predicted block mode, or else both the bit flag and the current block mode may be encoded. Therefore, in the event of the equal current block mode to the predicted block mode needing only the bit flag but not the current block mode to be encoded, the required bits for encoding the block mode may be reduced, improving the compression efficiency.

Here, the bit flag may be set as, for example, 'mb_pred_mode_flag' and composed of multiple bits such as multi-bit values of '000' or '111' although it may be of a single bit of '0' or '1'. With the single bit of the bit flag, in the event of the equal current block mode to the predicted block mode needing just the single bit to be delivered by itself or encoded along with other information, the compression efficiency is further improved.

For example, if the current block mode were determined as an intra 4×4 block mode and the predicted block mode using the history table as in the described aspect were in the intra 4×4 block mode too, since the current block mode and the predicted block mode are identical to each other as the intra 4×4 block mode, the bit flag mb_pred_mode_flag is set as value '1' not encoding the information for identifying the 'intra 4×4 block mode'. Therefore, this occasion may need only one bit of the encoded mode information for identifying the block mode of the corresponding current block.

Figure 4:
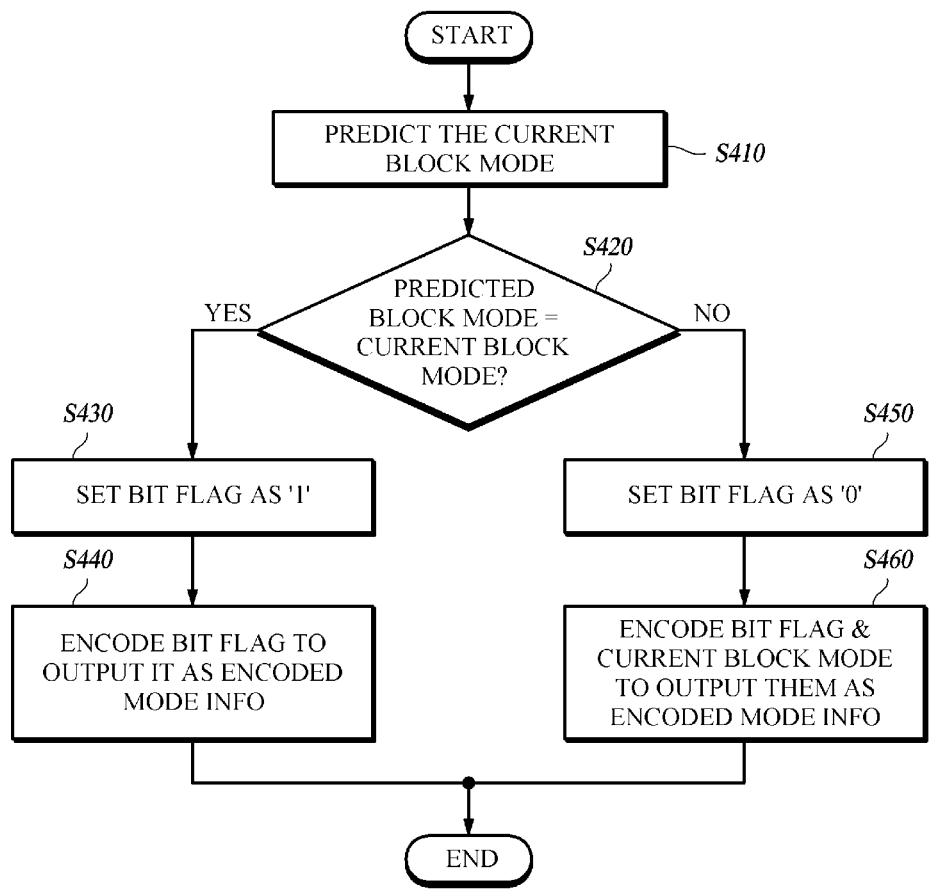
FIG. 4 is a flow diagram for illustrating a block mode encoding method according to an aspect.

FIG. 4 is a flow diagram for illustrating a block mode encoding method according to an aspect.

Block mode encoding apparatus 300 is adapted to predict a current block mode and responsive to whether the current block mode is identical to the predicted block mode for encoding the current block mode and outputting the encoded mode information, for which block mode encoding apparatus 300 may operate as illustrated in FIG. 4.

That is, block mode encoding apparatus 300 may predict the current block mode in step S410, compare between the current block mode and the predicted block mode to determine whether the predicted block mode is identical to the current block mode in step S420, and if they are identical, set the bit flag as, for example '1' to indicate that the block mode of the predetermined current block is identical to the predicted block mode or the current block mode is predicted using the bit flag in step S430, and encode not the current block mode but just the bit flag to output it as encoded mode information in step S440.

In addition, if step S 420 determines that the predicted block mode is identical to the predetermined current block mode, block mode encoding apparatus 300 may set the bit flag as, for example '0' to indicate that the block mode of the predetermined current block is not identical to the predicted block mode or the current block mode is not to be predicted using the bit flag in step S450, and encode not only the bit flag but also the current block mode to output them as encoded mode information in step S460.

The described steps of the block mode encoding method in the flow diagrams of FIG. 4 are merely examples for illustrative purpose and are not limited to occur necessarily in the described sequences. In other words, the respective steps may be selectively performed, the respective steps may be changed in the sequence of execution, and some or all of the steps may even be performed in parallel.

Figures 5, 6:
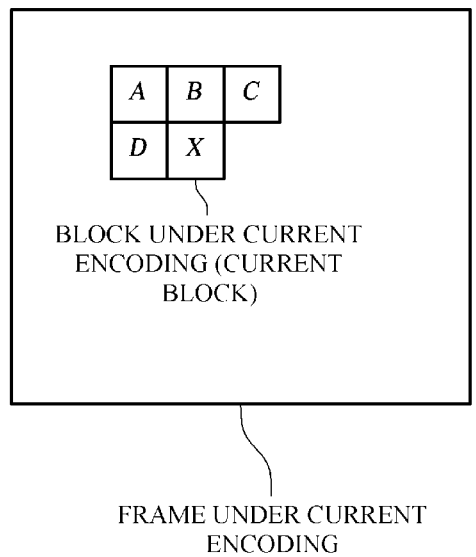
FIG. 5 is an exemplary diagram for showing locations of adjacent blocks used for composing a history table.
FIG. 6 is an exemplary diagram for showing the history table.

FIG. 5 is an exemplary diagram for showing locations of adjacent blocks used for composing a history table.

The history table herein means a table containing the history of the block mode of the subject block to be currently encoded and the history of block modes of its neighboring blocks for the purpose of predicting the current block for encoding based on the block modes of its neighboring blocks. When predicting the current block mode, an aspect of the present disclosure may use the history table.

Assuming the subject block to be currently encoded is 'X', its neighboring blocks for use in predicting the current block mode may be 'A, B, C, and D' among others.

FIG. 6 is an exemplary diagram for showing the history table.

In order to predict the current block mode using the neighboring block modes as illustrated in FIG. 5, when the neighboring block modes are determined as illustrated in FIG. 6, the history table is composed by indicating the prior decisions of the current block mode in certain modes in certain times. Upon completion of the history table as in FIG. 6, among the block modes of the blocks neighboring the current block to be currently predicted the one that is determined most frequently is predicted as the current block mode.

Figure 7:
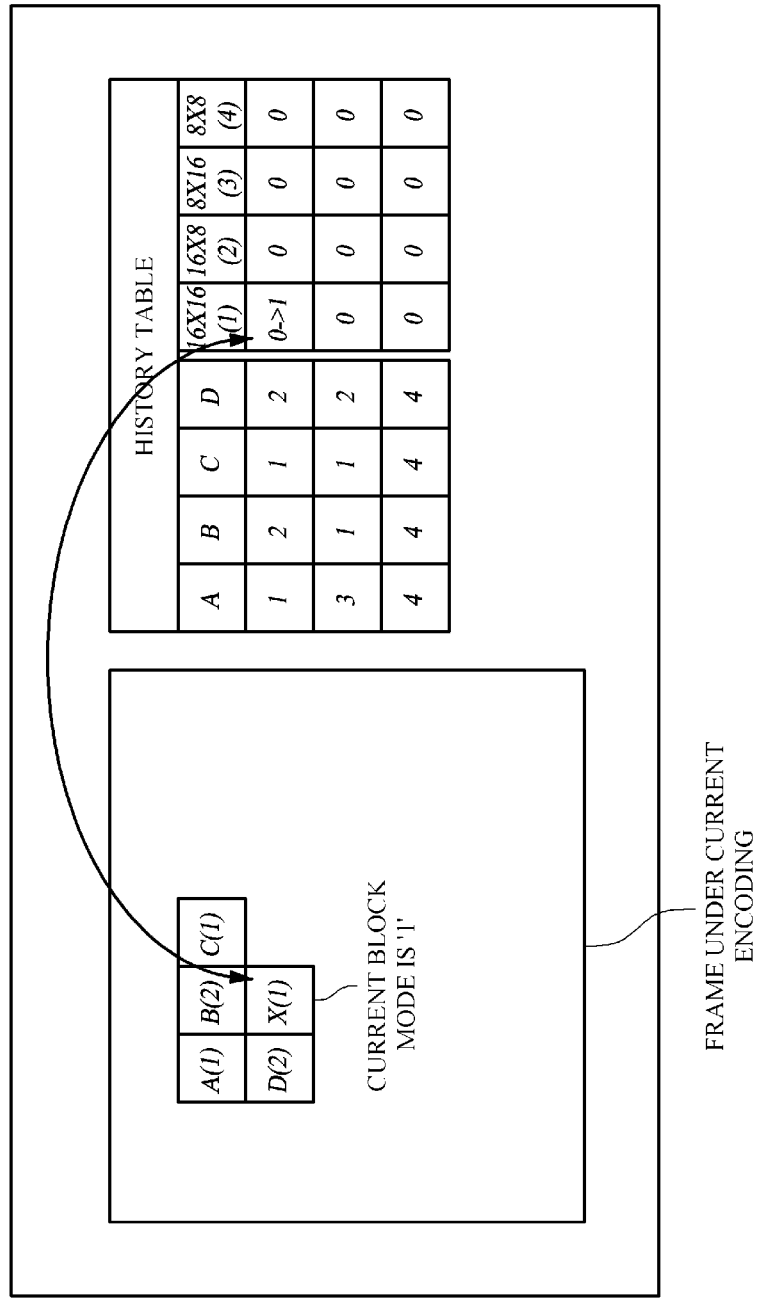
FIG. 7 is an exemplary diagram for illustrating the process of updating the history table.

FIG. 7 is an exemplary diagram for illustrating the process of updating the history table.

When neighboring blocks 'A, B, C, and D' are determined for the current block 'X', the history table is indexed by the respective conditions of the neighboring block modes. Assuming, as shown in FIG. 7, that the possible block modes of the current block are 16×16 (short for an inter 16×16 block mode), 16×8 (inter 16×8 block mode), 8×16 (inter 8×16 block mode), 8×8 (p8×8 block mode) and are respectively assigned mode numbers of '1', '2', '3', and '4', when '1' is the mode number of the block mode of current block 'X' to be updated into the history table and its neighboring blocks 'A, B, C, and D' have mode numbers '1, 2, 1, and 2', the place where 16×16 of indexing was made is updated from the frequency of '0' to '1' as illustrated.

When again '1' is the mode number of the block mode of current block 'X' to be updated into the history table and its neighboring blocks 'A, B, C, and D' have mode numbers '1, 2, 1, and 2', the same place where 16×16 of indexing is made will be updated from the frequency of '1' to '2'.

Figure 8:
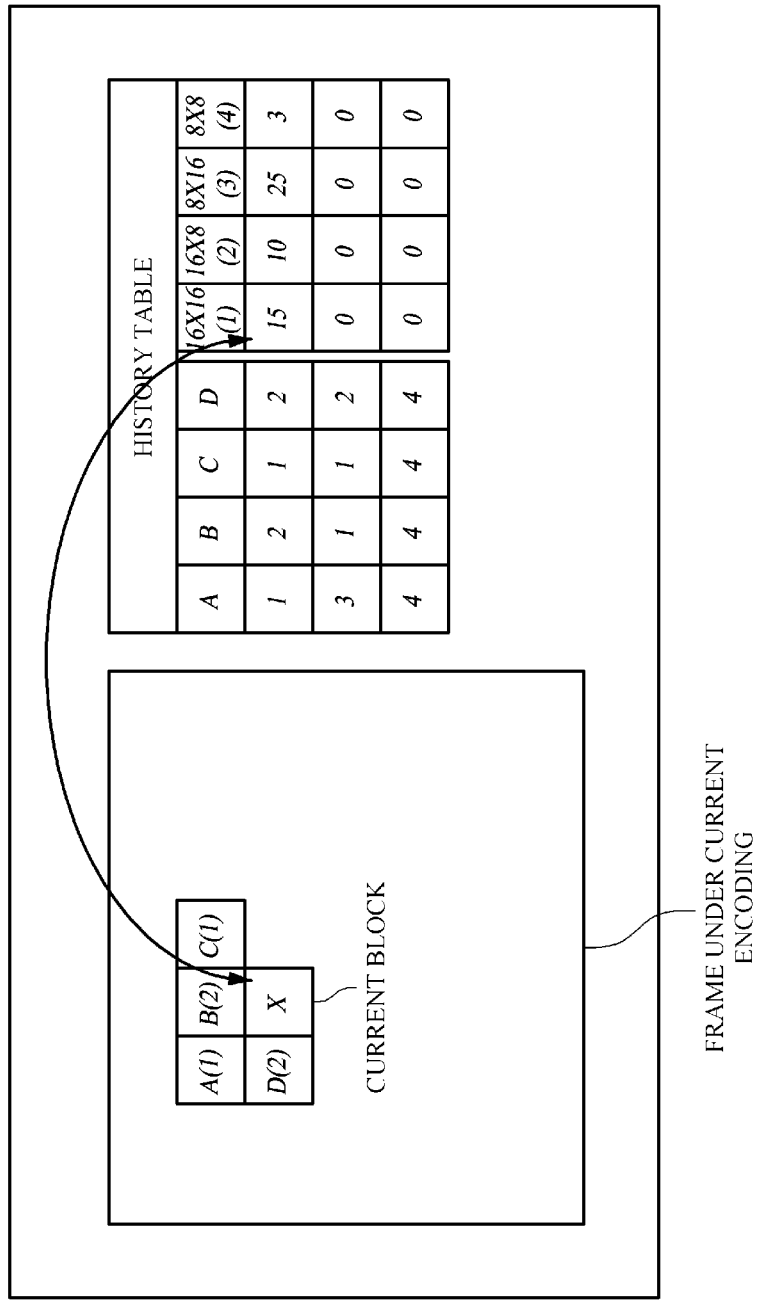
FIG. 8 is an exemplary diagram for illustrating the process of predicting a block mode by using the history table.

FIG. 8 is an exemplary diagram for illustrating the process of predicting the block mode by using the history table.

Upon completing the history table as in FIG. 8 by updating in the illustrated method in FIG. 7 with respect to many blocks determined so far or predetermined, such history table may be used to predict the current block mode.

For example, as shown in FIG. 8, if '1, 2, 1, and 2' are the mode numbers of the respective block modes of the neighboring blocks 'A, B, C, and D' of the current block 'X' needing its block mode to be predicted, the first row among the rows of the history table may be found corresponding to mode numbers '1, 2, 1, and 2' of the modes of blocks 'A, B, C, and D', and the most frequently occurred block mode '8×16' of the possible current block modes '16×16', '16×8', '8×16', and '8×8' may be determined to be the current block mode predicted. Since the block mode prediction method using such history table has an accuracy rate of 86% to 97%, probability is high that the predicted block mode is equal to the predetermined current block mode. In addition, upon determination of the eventual block mode to be used, the history table is updated using the block modes of the neighboring blocks.

Therefore, in encoding a block mode according to an aspect, using the illustrated example of the history table to predict the predetermined current block mode will increase the probability that a predicted block mode is identical to the predetermined current block mode, and the bit flag mb_pred_mode_flag is set to '1' if they are identical and '0' if they are not, and then just when the bit flag mb_pred_mode_flag is '0', the bit flag and the current block mode are allowed to be encoded to generate encoded mode information and when the bit flag mb_pred_mode_flag is '1', a mere single bit of bit flag is generated as the encoded mode information and outputted, which significantly reduces the quantity of bits for encoding the block mode.

Figure 9:
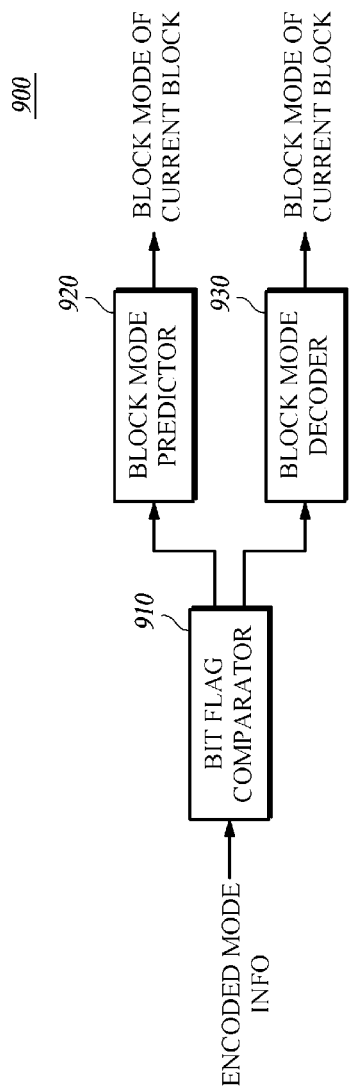
FIG. 9 is a schematic block diagram for illustrating a block mode decoding apparatus according to an aspect.

FIG. 9 is a schematic block diagram for illustrating a block mode decoding apparatus 900 according to an aspect.

Block mode decoding apparatus 900 in this aspect may comprise a bit flag comparator 910, a block mode predictor 920, and a block mode decoder 930. Such block mode decoding apparatus 900 may be a personal computer or PC, notebook or laptop computer, personal digital assistant or PDA, portable multimedia player or PMP, PlayStation Portable, or mobile communication terminal, smart phone or such devices, and represents a variety of apparatuses equipped with, for example, a communication device such as a modem for carrying out communications between various devices or wired/wireless communication networks, a memory for storing various programs for decoding the encoding modes and related data, and a microprocessor for executing the programs to effect operations and controls. In addition, depending on the method of implementation, it may be implemented as a program module installed in the various apparatuses stated above or as a singular hardware unit.

Bit flag comparator 910 extracts and analyzes the bit flag from the encoded mode information to determine whether the bit flag indicates that the current block mode is predicted. In other words, upon receiving the encoded mode information at input or receipt, bit flag comparator 910 extracts the bit flag to check the set value of the bit flag to see if it indicates the current block mode is predicted (i.e., whether the current block mode is identical to the predicted block mode). For example, if '1' is the set value of the bit flag extracted from the encoded mode information, the current block mode is determined to be predicted (i.e., the current block mode is identical to the predicted block mode), and if '0' is the set value of the bit flag extracted from the encoded mode information, the current block mode is determined not to be predicted (i.e., the current block mode is not identical to the predicted block mode). Here, although the set values of the bit flag are described to be '1' or '0', these are for illustrative purpose only and may be '11' or '00'. Therefore, the bit flag may comprise either a single bit or multiple bits.

Block mode predictor 920, in response to the bit flag indicating the current block mode is predicted, predicts the block mode of the current block mode and outputs the same as the current block mode. In other words, if bit flag comparator 910 determines that the bit flag indicates the current block mode to be predicted, block mode predictor 920 stops extracting the block mode of an encoded current block from the encoded mode information (where the encoded information lacks the current block mode, anyway), predicts the block mode of current block, and outputs the predicted block mode as the current block mode. This is where block mode predictor 920 may use the history table in predicting the block mode of current block. The prediction of the current block mode using the history was described with reference to FIGS. 5 to 8 and the detailed description will not be repeated.

Block mode decoder 930, in response to the bit flag indicating the current block mode is not predicted, extracts and decodes the block mode of the encoded current block from the encoded mode information (where the encoded information lacks the current block mode, anyway), and outputs the block mode of the reconstructed predicted block mode as the current block mode. In other words, if bit flag comparator 910 determines that the bit flag indicates the current block mode was not predicted (meaning the current block mode is not identical to the predicted block mode), block mode decoder 930 may extract the block mode of the current block encoded by block mode encoding apparatus 300 from the encoded mode information, decode the block mode of the encoded and extracted current block mode to reconstruct the current block mode, and output the reconstructed block mode of the current block as the current block mode.

Figure 10:
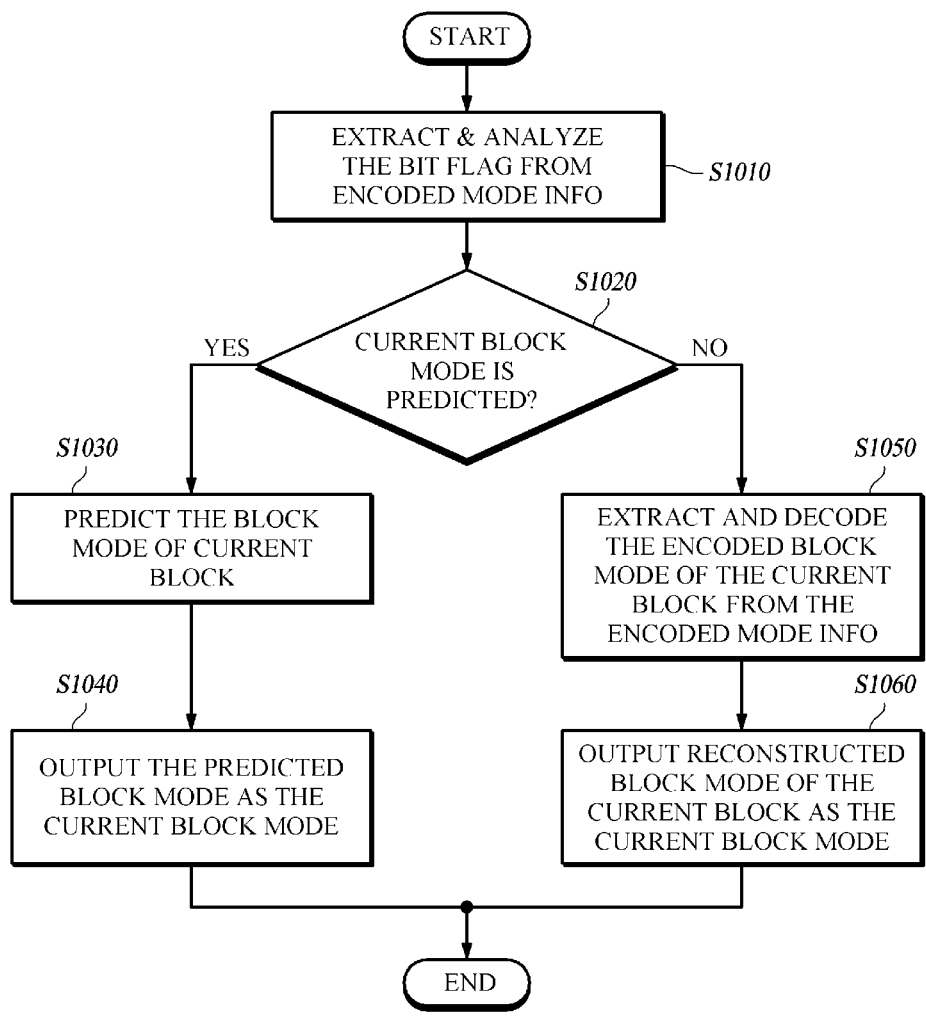
FIG. 10 is a flow diagram for illustrating a block mode decoding method according to an aspect.

FIG. 10 is a flow diagram for illustrating a block mode decoding method according to an aspect.

Block mode decoding apparatus 900 extracts and analyzes a bit flag from the encoded mode information in step S1010, determines if the bit flag indicates the current block mode is predicted in step S1020, and if so, predicts the block mode of the current block in step S1030 and outputs the predicted block mode as the current block mode in step S1040, while if the bit flag indicates the current block mode is not predicted, extracts the encoded block mode of the current block encoded from the encoded mode information, decodes the block mode of the encoded and extracted current block mode to reconstruct the current block mode in step S1050, and outputs the reconstructed block mode of the current block as the current block mode in step S1060.

The described steps of the block mode decoding method in the flow diagrams of FIG. 10 are merely examples for illustrative purpose and are not limited to occur necessarily in the described sequences. In other words, the respective steps may be selectively performed, the respective steps may be changed in the sequence of execution, and some steps may be performed in parallel.

The described block mode encoding apparatus 300 and block mode decoding apparatus 900 according to an aspect may be implemented independently although they may be implemented as units or program modules within the block mode encoding apparatus and the block mode decoding apparatus for encoding and decoding the block mode. In the following, descriptions will be provided for a video encoding apparatus and a video decoding apparatus equipped with block mode encoding apparatus 300 and block mode decoding apparatus 900.

Figure 11:
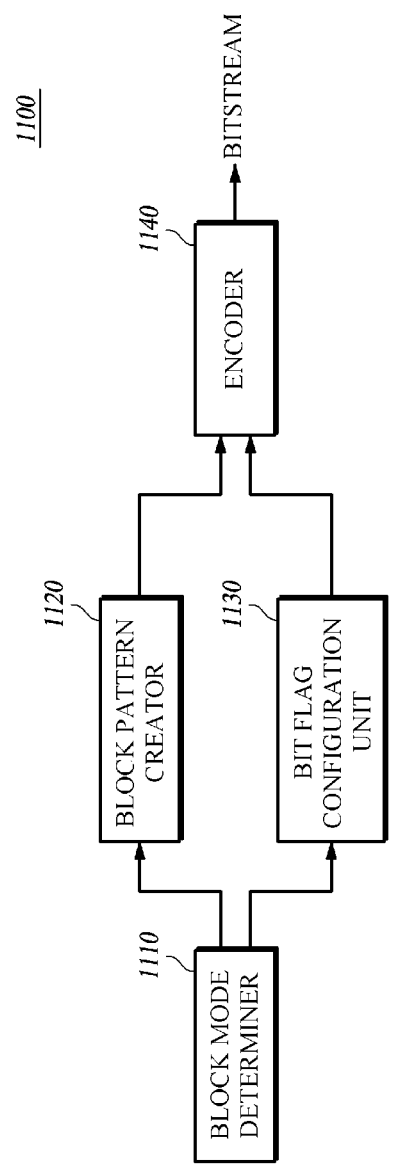
FIG. 11 is a schematic block diagram for illustrating a video encoding apparatus according to an aspect.

FIG. 11 is a schematic block diagram for illustrating a video encoding apparatus 1100 according to an aspect.

Video encoding apparatus 1100 in this aspect may comprise a block mode determiner 1110, block pattern creator 1120, bit flag configuration unit 1130, and an encoder 1140. Such video encoding apparatus 1110 may be a personal computer or PC, notebook or laptop computer, personal digital assistant or PDA, portable multimedia player or PMP, PlayStation Portable or PSP, or mobile communication terminal, smart phone or such devices, and represents a variety of apparatuses equipped with, for example, a communication device such as a modem for carrying out communications between various devices or wired/wireless communication networks, a memory for storing various programs for encoding the videos and related data, and a microprocessor for executing the programs to effect operations and controls.

Block mode determiner 1110 determines the block mode of the current block. In other words, block mode determiner 1110 uses various predetermined techniques including the rate-distortion optimization (RDO) in determining the appropriate block mode to encode the current block considering the bit quantity, the picture quality, etc.

Block pattern creator 1120 generates a coded block pattern by predicting the current block according to its block mode determined. Specifically, block pattern creator 1120 first generates a predicted block by predicting the current block according to its block mode determined by block mode determiner 1110 and generates a coded block pattern from transforming and quantizing a residual block generated by subtracting the predicted block from the current block. For this purpose, block pattern creator 1120 may include a part or the entirety of the video encoding apparatus described with reference to FIG. 1.

Bit flag configuration unit 1130 configures the bit flag which indicates whether the predicted block mode generated from predicting the current block mode is identical to the current block mode. Specifically, bit flag configuration unit 1130 predicts the current block mode by using various techniques and compares the predicted block mode with the current block mode determined by block mode determiner 1110 to set a bit flag for indicating that the current block mode is to be predicted (or that the current block mode is identical to the predicted block mode) if the current block mode and the predicted block mode are same and set a bit flag for indicating that the current block mode is not to be predicted (or that the current block mode is not identical to the predicted block mode) if the current block mode and the predicted block mode are not same.

Here, bit flag configuration unit 1130 may predict the current block mode using the history table just as described through FIGS. 5 to 8 and the detailed description will not be repeated. In addition, the configured bit flag from bit flag configuration unit 1130 may comprise multiple bits or a single bit such as '1' or '0' which further improves the compression efficiency as described above.

Encoder 1140, in response to the bit flag indicating the current block mode is identical to the predicted block mode, encodes the bit flag and the coded block pattern to generate a bitstream; and in response to the bit flag indicating the current block mode is not identical to the predicted block mode, encodes the bit flag, the current block mode, and the coded block pattern to generate a bitstream; and outputs the generated bitstream. Specifically, encoder 1140 differently performs the encoding by the configured bit flag from bit flag configuration unit 1130 with respect to the current block mode which is being encoded along with the coded block pattern, and specifically it just encodes the coded block pattern and the bit flag when the bit flag indicates the current block mode to be identical to the predicted block mode and encodes not only the coded block pattern and the bit flag but also the current block mode when the bit flag indicates the current block mode not to be identical to the predicted block mode.

As described, depending on whether the current block mode is identical to the predicted encoding mode, video encoding apparatus 1100 according to an aspect informs through the bit flag after a positive check of just the fact that the subsequently described video decoding apparatus could predict the current block mode too so as to permit the video decoding apparatus to expect and use the current block mode. In this case, video encoding apparatus 1100 needs not the current block mode but just the bit flag to be encoded, thereby reducing the quantity of bits for encoding and improving the video compression efficiency.

Figure 12:
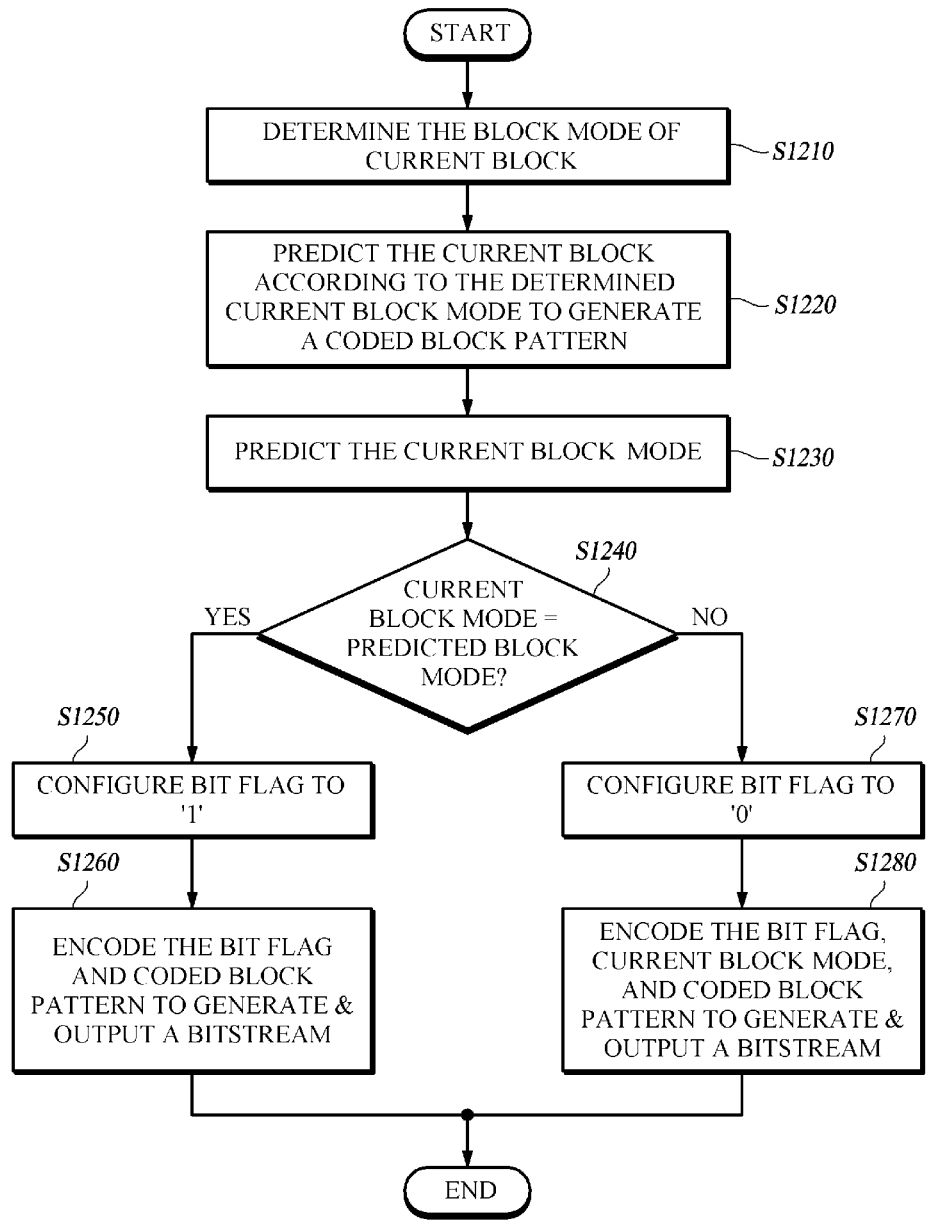
FIG. 12 is a flow diagram for illustrating a video encoding method according to an aspect.

FIG. 12 is a flow diagram for illustrating a video encoding method according to an aspect.

Video encoding apparatus 1100 determines the block mode of the current block in step S1210, predicts the current block according to the determined current block mode to generate a coded block pattern in step S1220, predicts the current block mode through a prediction method of using a history table or other prediction methods in step S1230, and determines if the determined current block mode is identical to a predicted block mode in step S1240.

Video encoding apparatus 1100 is responsive to the determination in step S1240, and if the current block mode and the predicted block mode are same, sets a bit flag (as '1' for example) to indicate that the current block mode is identical to the predicted block mode in step S1250, and encodes the bit flag and the coded block pattern to generate and output a bitstream in step S1260.

Additionally, video encoding apparatus 1100 is responsive to the determination in step S1240, and if the current block mode and the predicted block mode are not same, sets a bit flag (as '0' for example) to indicate that the current block mode is not identical to the predicted block mode in step S1270, and encodes not only the bit flag but also the current block mode along with the coded block pattern to generate and output a bitstream in step S1280.

The described steps of the video encoding method in the flow diagrams of FIG. 12 are merely examples for illustrative purpose and are not limited to occur necessarily in the described sequences. In other words, the respective steps may be selectively performed, the respective steps may be changed in the sequence of execution, and some steps may be performed in parallel.

The bitstream corresponding to the current block and generated by video encoding apparatus 1100 as described may then be transmitted in units of a block or in units of a slice of multiple blocks combined or in units of a frame and in real time or non-real-time to a video decoding apparatus described below for decoding the same before its reconstruction and reproduction into the video via a wired/wireless communication network including the Internet, a short range wireless communication network, a wireless LAN network, WiBro (Wireless Broadband) also known as WiMax network, and mobile communication network or a communication interface such as cable, USB (universal serial bus), or other various means.

Figure 13:
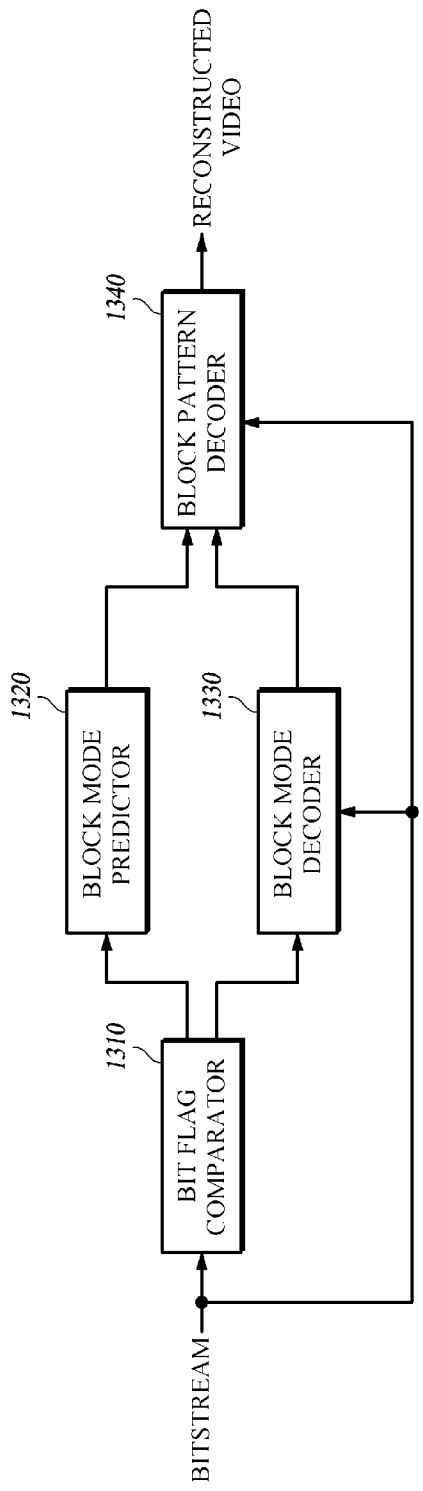
FIG. 13 is a schematic block diagram for illustrating a video decoding apparatus according to an aspect.

FIG. 13 is a schematic block diagram for illustrating a video decoding apparatus 1300 according to an aspect.

Video decoding apparatus 1300 in this aspect may comprise a bit flag comparator 1310, a block mode predictor 1320, and a block mode decoder 1330, and a block pattern decoder 1340. Such video decoding apparatus 1300 may be a personal computer or PC, notebook or laptop computer, personal digital assistant or PDA, portable multimedia player or PMP, PlayStation Portable or PSP, or mobile communication terminal, smart phone or such devices, and represents a variety of apparatuses equipped with, for example, a communication device such as a modem for carrying out communications between various devices or wired/wireless communication networks, a memory for storing various programs for decoding the videos and related data, and a microprocessor for executing the programs to effect operations and controls.

Bit flag comparator 1310 extracts and analyzes the bit flag from the bitstream to determine whether the bit flag indicates that the current block mode is predicted. In other words, upon receiving the bitstream at input or receipt, bit flag comparator 1310 extracts the bit flag from the bitstream to compare the extracted bit flag value with the prestored value to see if it indicates the current block mode is predicted or not.

For example, assuming that reference values '1' and '0' are stored in bit flag comparator 1310 as a way to determine if the bit flag indicates the prediction status of the current block mode and that '1' indicates the predictability of the current block mode while '0' indicates the non-prediction of the current block mode, and when the bit flag extracted from the bitstream is valued '1' which is then compared with the prestored reference value, it can be determined that there is a prediction of the block mode of the current block corresponding to the bitstream. Therefore, the bit flag in the bitstream may be formed of a single bit as in the described example, although this is not a necessary limitation and it may be consisted of multiple bits.

Block mode predictor 1320, in response to the bit flag indicating the current block mode is predicted, predicts the block mode of the current block mode and outputs the same as the current block mode. In other words, if bit flag comparator 1310 is determined to predict the current block mode, block mode predictor 1320 predicts the current block mode using various prediction techniques and outputs the predicted block mode as the current block mode. Here, block mode predictor 1320 may use the history table in predicting the block mode of current block.

Block mode decoder 1330, in response to the bit flag indicating non-prediction of the current block mode, extracts and decodes the block mode of the encoded current block from the bitstream, and outputs the block mode of the reconstructed current block mode as the current block mode. In other words, if bit flag comparator 1310 is determined not to predict the current block mode, block mode decoder 1330 extracts the block mode of the current block additionally encoded from the bitstream, decodes the block mode of the encoded and extracted current block mode to reconstruct the current block mode, and outputs the reconstructed block mode of the current block as the current block mode.

Block pattern decoder 1340 extracts the coded block pattern from the bitstream and decodes the extracted pattern according to the outputted current block mode to reconstruct the current block. Specifically, block pattern decoder 1340 extracts the coded block pattern from the bitstream and decodes the coded and extracted block pattern according to the current block mode outputted from block mode predictor 1320 or block mode decoder 1330 to reconstruct the current block.

Figure 14:
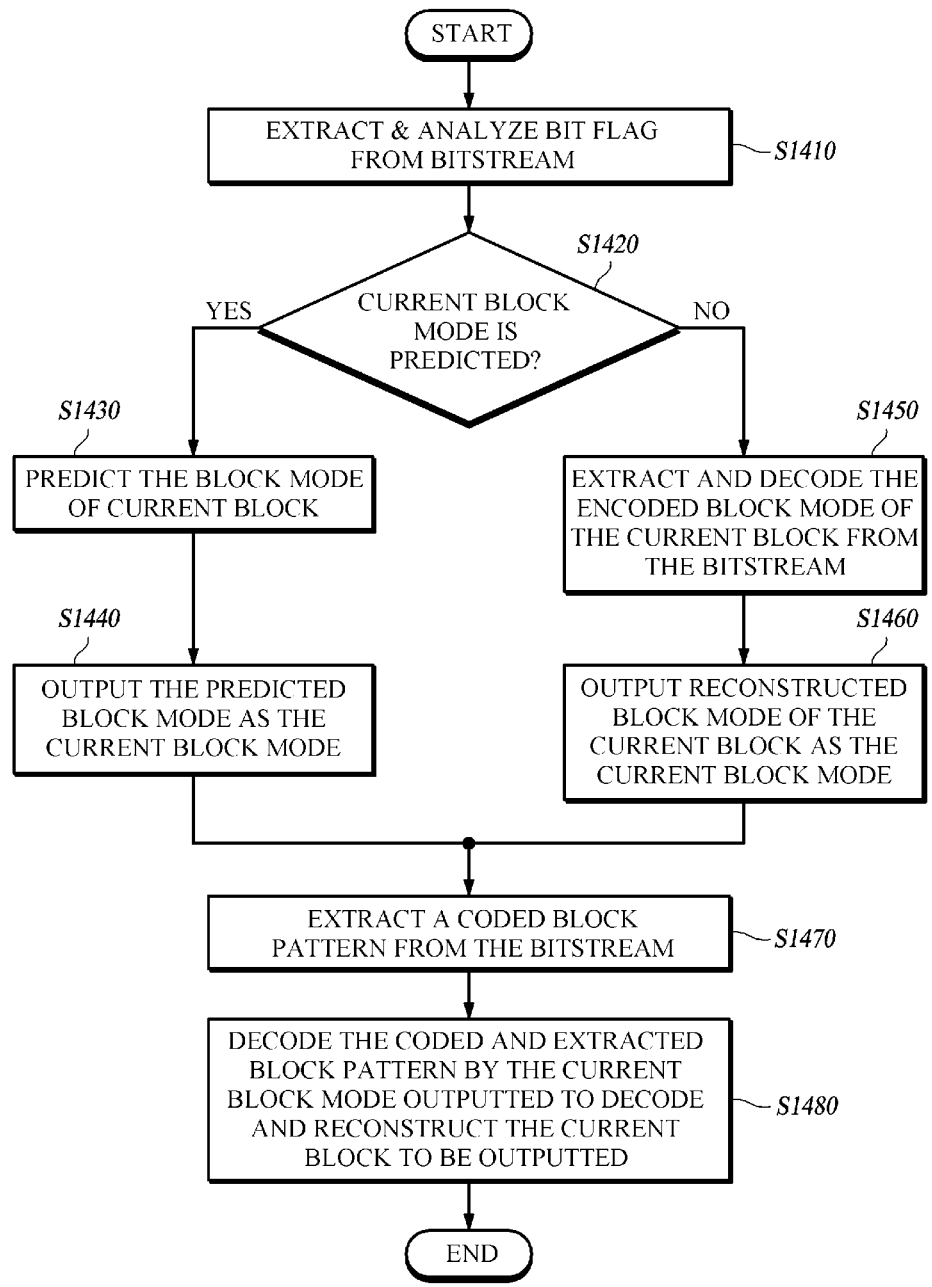
FIG. 14 is a schematic block diagram for illustrating a video decoding method according to an aspect.

FIG. 14 is a schematic block diagram for illustrating a video decoding method according to an aspect.

Video decoding apparatus 1300 extracts and analyzes a bit flag from the bitstream in step S1410, determines if the bit flag indicates the prediction of the current block mode in step S1420, and if so, predicts the block mode of the current block in step S1430 and outputs the predicted block mode as the current block mode in step S1440, while if the bit flag indicates the current block mode is not predicted, extracts and decodes the encoded block mode of the current block encoded from the bitstream to reconstruct the current block mode in step S1450, and outputs the reconstructed block mode of the current block as the current block mode in step S1460.

In addition, video decoding apparatus 1300 extracts a coded block pattern from the bitstream in step S1470, decodes the coded and extracted block pattern according to the current block mode outputted in step S1440 or step S1460 to decode and reconstruct the current block in step S1480.

The described steps of the video decoding method in the flow diagrams of FIG. 14 are merely examples for illustrative purpose and are not limited to occur necessarily in the described sequences. In other words, the respective steps may be selectively performed, the respective steps may be changed in the sequence of execution, and some steps may be performed in parallel.

Meanwhile, although the description was that the current block mode being the SKIP mode would also subject to a comparison check with a predicted block mode and accordingly the current block mode would then be encoded, the bit flag may be additionally configured to be mb_skip_flag to be able to encode the identification of current block mode when it is the SKIP mode. Therefore, in this case, encoded mode information will contain mb_skip_flag a the bit flag.

According to the aspect as described, encoding as little as a single bit becomes suffice to provide the block mode information when the current block mode is identical to the predicted block mode, the compression performance can be improved without having to substantially change block mode encoding apparatus 300 or video encoding apparatus 1100 in its structure and syntax.

In addition, an aspect of the disclosure may increase the accuracy of predicting the current block mode through using the history table improving the probability that the current block mode is identical to the predicted block mode, which increases the number of cases that the single-bit encoding provides the block mode information and thereby further improves the compression performance.

In the description above, although all of the components of the aspect of the present disclosure may have been explained as assembled or operatively connected as a unit, the present disclosure is not intended to limit itself to such aspect. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is highly useful for application to video processing techniques of block-based encoding/decoding the videos and reduces the quantity of bits required to encode information on block modes resulting in an improvement of the video compression efficiency.

The invention claimed is:

1. A video encoding apparatus for encoding an image using a block mode, comprising:
   a block mode predictor configured to predict a block mode of a current block; and
   a block mode encoder configured to encode mode information of the current block depending on whether the predicted block mode of the current block is identical to a determined block mode of the current block,
   wherein the block mode predictor is configured to predict the block mode of the current block using a history table which includes previously determined block mode information according to a plurality of block modes of neighboring blocks of the current block.

2. The video encoding apparatus of claim 1, wherein the block mode encoder is configured to encode a bit flag as the mode information when the predicted block mode of the current block is identical to the determined block mode of the current block, and the bit flag indicates that the predicted block mode of the current block is identical to the determined block mode of the current block.

3. The video encoding apparatus of claim 1, wherein the block mode encoder is configured to encode a bit flag and the determined block mode of the current block as the mode information when the predicted block mode of the current block is not identical to the determined block mode of the current block, and the bit flag indicates that the predicted block mode of the current block is not identical to the determined block mode of the current block.

4. The video encoding apparatus of claim 2, wherein the bit flag comprises a single bit.

5. A video encoding method for encoding an image using a block mode, comprising:
   predicting a block mode of a current block using a history table which includes previously determined block mode information according to a plurality of block modes of neighboring blocks of the current block; and
   encoding mode information of the current block depending on whether the predicted block of the current block is identical to a determined block mode of the current block.

6. A video decoding apparatus for decoding an image using a block mode, the video decoding apparatus comprising:
   a bit flag comparator configured to extract a bit flag from encoded mode information and determine whether the bit flag indicates that the block mode of the current block is to be predicted;
   a block mode predictor configured to predict the block mode of the current block and to output the predicted block mode as the block mode of the current block when a value of the bit flag indicates that the block mode of the current block is to be predicted; and
   a block mode decoder configured to extract an encoded block mode of the current block from the encoded mode information, to decode the encoded block mode to generate a reconstructed block mode of the current block, and to output the reconstructed block mode as the block mode of the current block when a value of the bit flag indicates that the block mode of the current block is not to be predicted,
   wherein the block mode predictor is configured to predict the block mode of the current block using a history table which includes previously determined block mode information according to a plurality of block modes of neighboring blocks of the current block.

7. The video decoding apparatus of claim 6, wherein the bit flag comprises a single bit.

8. A video decoding method for decoding an image using a block mode, the video decoding method comprising:
   extracting a bit flag from an encoded mode information and determining whether the bit flag indicates that the block mode of the current block is to be predicted;
   when a value of the bit flag indicates that the block mode of the current block is to be predicted, predicting the block mode of the current block using a history table which includes previously determined block mode information according to a plurality of block modes of neighboring blocks of the current block and outputting the predicted block mode of the block mode as the block mode of the current block;
   when a value of the bit flag indicates that the block mode of the current block is not to be predicted, extracting an encoded block mode of the current block from the encoded mode information;
   decoding the encoded block mode to reconstruct a block mode of the current block; and
   outputting the reconstructed block mode of the current block as the block mode of the current block.

9. A video decoding apparatus for decoding an image using a block mode, comprising:
   a bit flag comparator configured to extract a bit flag from a bitstream and to determine whether the bit flag indicates that a block mode of a current block mode is to be predicted;
   a block mode predictor configured to predict the block mode of the current block and to output the predicted block mode as the block mode of the current block when a value of the bit flag indicates that the block mode of the current block is to be predicted;
   a block mode decoder configured to extract an encoded block mode of the current block from the bitstream, to decode the encoded block mode to generate a reconstructed block mode of the current block and to output the reconstructed block mode as the block mode of the current block when a value of the bit flag indicates that the block mode of the current bock is not to be predicted; and
   a block pattern decoder configured to extract a coded block pattern from the bitstream and to decode the coded block pattern according to the block mode of the current block,
   wherein the block mode predictor is configured to predict the block mode of the current block using a history table which includes previously determined block mode information according to a plurality of block modes of neighboring blocks of the current block.

10. The video decoding apparatus of claim 9, wherein the bit flag comprises a single bit.

11. A video decoding method of decoding an image using a block mode, the video decoding method comprising:
   extracting a bit flag from a bitstream and determining whether the bit flag indicates that the block mode of a current block mode is to be predicted;
   when a value of the bit flag indicates that the block mode of the current block is to be predicted, predicting the block mode of the current block using a history table which includes previously determined block mode information according to a plurality of block modes of neighboring blocks of the current block, and
   outputting the predicted block mode as the block mode of the current block;

when a value of the bit flag indicates that the block mode of the current block is not to be predicted, extracting an encoded block mode of the current block from the bitstream, decoding the encoded block mode to generate a reconstructed block mode of the current block, and outputting the reconstructed block mode of the current block as the block mode of the current block; and extracting a coded block pattern from the bitstream and decoding the coded block pattern according to the block mode of the current block to reconstruct the current block.

* * * * *